United States Patent [19]

Surauer et al.

[11] Patent Number: 5,558,305
[45] Date of Patent: Sep. 24, 1996

[54] MEASURING ARRANGEMENT USEFUL FOR CONTROLLING THE ATTITUDE OF A THREE-AXIS STABILIZED SATELLITE, CORRESPONDING EVALUATION PROCESS, REGULATING SYSTEM AND PROCESS

[75] Inventors: Michael Surauer, Chieming; Helmut Bittner; Walter Fichter, both of Munich; Horst-Dieter Fischer, Unterhaching, all of Germany

[73] Assignee: Deutsche Aerospace AG, Germany

[21] Appl. No.: 204,324

[22] PCT Filed: Sep. 4, 1992

[86] PCT No.: PCT/EP92/02051

§ 371 Date: Jul. 27, 1994

§ 102(e) Date: Jul. 27, 1994

[87] PCT Pub. No.: WO93/04923

PCT Pub. Date: Mar. 18, 1993

[30] Foreign Application Priority Data

Sep. 6, 1991 [DE] Germany .......................... 41 29 630.3

[51] Int. Cl.⁶ .................................................. B64G 1/36
[52] U.S. Cl. ................................................... 244/171
[58] Field of Search ................................... 244/164, 165, 244/169, 170, 171; 250/203.4

[56] References Cited

U.S. PATENT DOCUMENTS

| | | |
|---|---|---|
| 5,042,752 | 8/1991 | Surauer et al. .......................... 244/171 |
| 5,062,592 | 11/1991 | Kishimoto ................................. 244/164 |
| 5,080,307 | 1/1992 | Smay et al. ............................... 244/171 |
| 5,130,931 | 7/1992 | Paluszek et al. .......................... 244/171 |
| 5,255,879 | 10/1993 | Yocum et al. ............................ 244/171 |

*Primary Examiner*—Galen L. Barefoot
*Attorney, Agent, or Firm*—Evenson, McKeown, Edwards & Lenahan

[57] ABSTRACT

A measurement arrangement is useful for controlling the attitude of a three-axis stabilized satellite equipped with sun-sensors for determining the orientation of the sun (sun vector) with respect to a satellite-fixed coordinate system, as well as with speed gyroscopes for detecting components of the satellite speed of rotation vector $\omega$. It is necessary that the measurement range of the sun-sensors cover the round angle in a preselectable plane (for example XY plane) and perpendicularly thereto a limited angular range of maximum $\pm\alpha_{2max}$ on both sides of the plane. In addition, only an integrating speed gyroscope carrying out measurements in a single measurement axis that encloses with the plane an angle of at least $(\pi/2)-\alpha_{2max}$ should be provided. Also disclosed are an evaluation process for determining the satellite speed of rotation, as well as the satellite deviation with respect to a direction of reference, a regulating system for carrying out attitude control maneuvers using the measurement arrangement and the evaluation process, and a corresponding regulating process.

9 Claims, 6 Drawing Sheets

MEASURING ARRANGEMENT USEFUL FOR CONTROLLING THE ATTITUDE OF A THREE-AXIS STABILIZED SATELLITE, CORRESPONDING EVALUATION PROCESS, REGULATING SYSTEM AND PROCESS

BACKGROUND AND SUMMARY OF THE INVENTION

The invention relates to a measuring arrangement for determining the sun and earth orientation of a three-axis stabilized satellite and a corresponding process for determining the rotational velocity of the satellite and the deviation of the satellite as well as to a system for implementing attitude control maneuvers by using such a measuring arrangement and corresponding regulating processes.

A measuring arrangement of the initially mentioned type is known from H. Bittner, et al., "The Attitude Determination and Control Subsystem of the Intelsat V Spacecraft", Proceedings of AOCS Conference, Nordwijk, Oct. 3 to 6, 1977, ESA SP-128, November 1977. The satellites of this known type have a redundantly designed speed gyroscope package which measures in all three axes X, Y, Z of the satellite-fixed system of coordinates, as well as several sun sensors which are also designed in a redundant manner and have two fields of view. One field of view is centered about the negative Z-axis, which comprises one half of the XZ-plane, and has a specific width perpendicularly with respect to it (in the direction of the Y-axis). The other filled of view is centered about the positive X-axis, comprises one third of the XY-plane and also has a specific width perpendicularly to it. This sensor arrangement is used for tracking, in a measuring manner, rotations of the satellite body, that is, the components of the rotational speed vector of the satellite and, irrespectively of it, detecting the orientation of the satellite with respect to the sun by the determination of the sun vector pointing from the satellite to the center of the sun as soon as the sun is in the field of view of the sun sensors. The measuring results supplied by the sensors are used by the attitude control system of the satellite for commanding attitude changes or rotations in a targeted manner in order to be able to carry out the maneuvers required in the transfer orbit and in the final satellite orbit and to be able to correct occurring attitude deviations.

The speed gyroscopes used for the measuring, control and damping of rotational movements of the satellite are very complicated electromechanical precision devices, and are therefore correspondingly expensive and susceptible to disturbances. For meeting the reliability requirements under the extreme environmental conditions in space, particularly in the case of long-time missions, these devices must also be present in a redundant manner, which also increases the expenditures with respect to cost and weight. When one measuring axis is absent in a gyroscope package containing several speed gyroscopes, the remaining gyroscope axes can generally also no longer be used. Since the possibility of failure of a system rises with the number of functional elements, the use of a measuring system with a large number of electromechanical components which are susceptible to disturbances also has a higher risk of failure.

The invention is therefore based on the object of providing a measuring arrangement of the above-mentioned type which is less expensive and more reliable. By means of this measuring arrangement, it must be possible to carry out largely automatically on board of the satellite all maneuvers required in the transfer orbit as well as in the final satellite orbit, particularly in the geosynchronous orbit. Furthermore, if possible, the number of components which are susceptible to disturbances is to be reduced to a minimum.

The required maneuvers include: sun acquisition from any starting position; the earth acquisition from the sun orientation; alignment for the apogee maneuver, attitude stabilization in the desired orientation and the damping of movement during the maneuver period in the transfer orbit; as well as the earth and sun reacquisition in the geosynchronous orbit.

This object is achieved by the according to the invention, which measuring comprises a plurality of sun sensors arranged such that the measuring of the components of the sun vector is made possible in a plane in the full angular range ($0 \leq \alpha_1 \leq 2\pi$) and perpendicularly to this plane in a limited angular range $|\alpha_2| \leq \alpha_{2max}$ ($\alpha_{2max} < 90°$). This is based on a satellite-fixed system of coordinates, preferably a cartesian XYZ-system with the roll axis X, the pitch axis Y as well as the yaw axis Z, in which case, in the geosynchronous orbit, the roll axis is generally oriented in the orbiting direction, the yaw axis is oriented toward the center of the earth, and the pitch axis is oriented perpendicularly to the plane of the orbit. The plane, which in the following will also be called the measuring plane and which is to be fully detected by the measuring range of the sun sensors, may, for example, be the XZ-plane. Perpendicularly to it, that is, in the direction of the Y-axis, the measuring range of the sun sensors will then be limited ($\pm \alpha_{2max}$). The thus defined measuring range of the sun sensors may be formed by adjoining or overlapping fields of view of several individual sun sensors with differently aligned optical axes.

As a further essential characteristic, it is required that, instead of the speed gyroscope package, which measures in three-axes in the case of known satellites, an integrating speed gyroscope must now be provided which measures in only one axis. Its measuring axis, which is represented by a unit vector $\underline{G}$, together with the measuring plane of the sun sensors, must now enclose an angle β which is larger than $(\pi/2)-\alpha_{2max}$. Therefore, the measuring axis of the speed gyroscope must be within a double cone centered in the origin 0 of the system of coordinates, the axis of symmetry of the double cone being situated perpendicularly on the measuring plane of the sun sensors. When the XZ-plane is used as the measuring plane of the sun sensors, this axis of symmetry is the Y-axis.

In a further development of the invention, it is provided that the permissible solid-angle range for the measuring axis of the speed gyroscope is limited even further. The reasons for the requirement with respect to the permissible alignment of the measuring axis of the speed gyroscope will explained in detail hereinafter.

According to another feature of the invention evaluation processes are provided to determine the rotational speed of the satellite as well as the deviation of the satellite with respect to a preset reference direction, using the measuring arrangement according to the invention A regulating system is also provided to implement attitude control maneuvers while using the measuring arrangement according to the invention as well as the above-mentioned corresponding evaluation processes. Further embodiments provide regulating processes, particularly regulator equations for use in the above-mentioned regulating system.

Other objects, advantages and novel features of the present invention will become apparent from the following detailed description of the invention when considered in conjunction with the accompanying drawings.

DETAILED DESCRIPTION OF THE DRAWINGS

Figure 1:
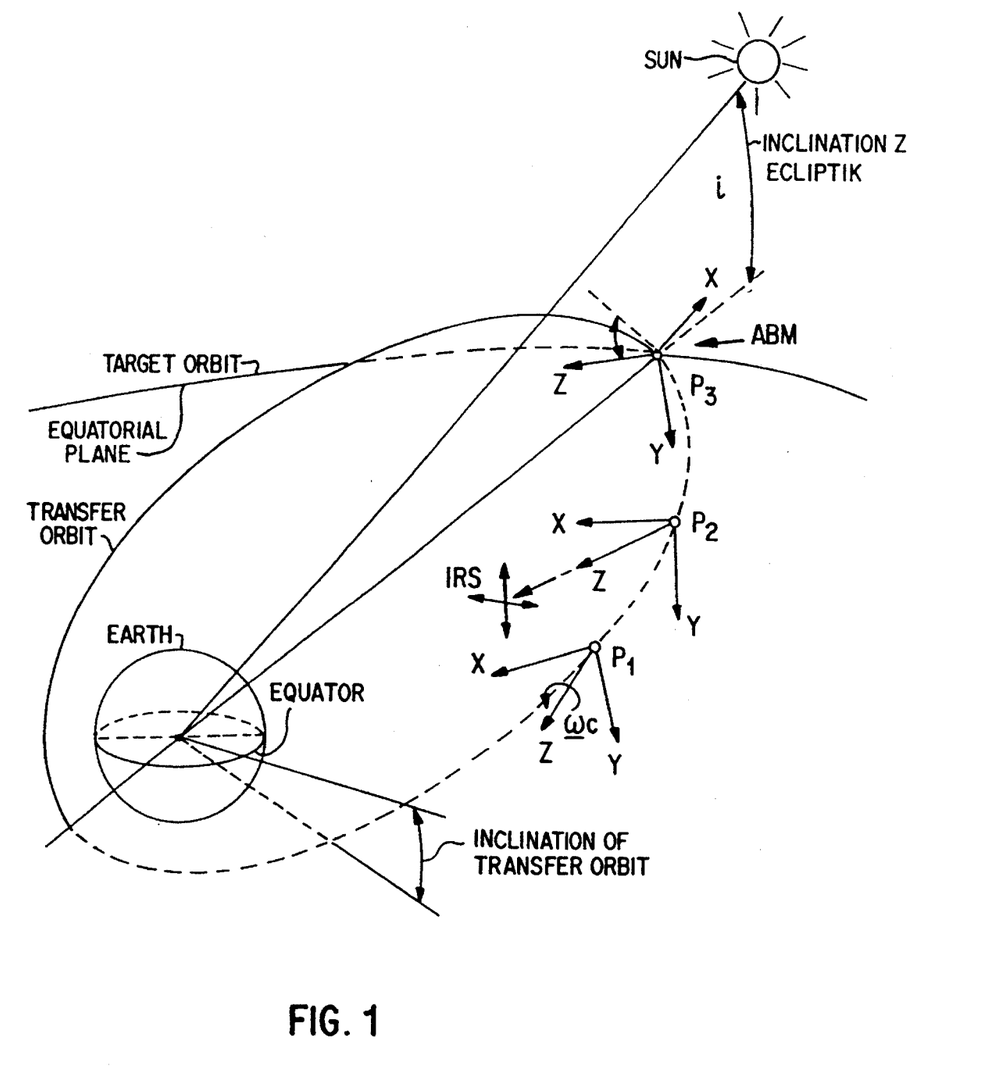
FIG. 1 is a schematic view of the geometry of the transfer orbit and the geosynchronous orbit for an earth satellite, relative to the earth and the sun.

The invention may be used in the case of geosynchronous satellites, among others. FIG. 1 is a schematic view of the transfer orbit of such a satellite as well as of a portion of the geosynchronous satellite orbit. The satellite is first transported to an elliptic transfer orbit with a low perigee (orbital point closest to the earth) whose apogee (orbital point farthest from the earth) already corresponds to the radius of the final, almost circular, geosynchronous satellite orbit. The plane of the geosynchronous satellite orbit corresponds approximately to the equatorial plane. The plane of the transfer orbit is inclined with respect to the plane of the geosynchronous orbit.

After the detaching of the transport vehicle, the satellite must carry out several maneuvers on the transfer orbit before it is finally injected into the geosynchronous orbit. FIG. 1 shows three different positions $P_1$ to $P_3$ of the transfer orbit in which the satellite is to take up the respective different orientations. In position $P_1$, the satellite is aligned with the sun along its negative Z-axis and rotates about the connecting line satellite—center of the sun at a commendable rotational speed $\omega_C$ (rotational speed vector $\underline{\omega}_C$). In position $P_2$, the earth acquisition has already taken place so that satellite is oriented with its positive Z axis aligned toward the center of the earth. This takes place by means of its infrared sun sensors (IRS) which look into the direction of the Z-axis and whose mutually orthogonal measuring directions are indicated schematically. By means of the earth and sun sensors, this orientation permits the establishment of an optical three-axis reference for the calibration of the gyroscope and for achieving the correct orientation of the satellite before the initiation of the apogee maneuver in position $P_3$. For this maneuver, the satellite must be oriented by means of its positive Z-axis into the direction which has the geosynchronous orbit in the intersection with the transfer orbit because the thrust of the apogee engine acts in the direction of the negative Z-axis.

The maneuvers described here for the transfer orbit, specifically the sun and earth acquisition, may naturally also become necessary on the geosynchronous orbit as soon as the required earth and/or sun orientation is lost. Naturally, the invention may also be applied to other transfer orbit and satellite configurations, particularly as far as the arrangement of the apogee engine and possibly of the earth sensors is concerned.

Figure 2A:
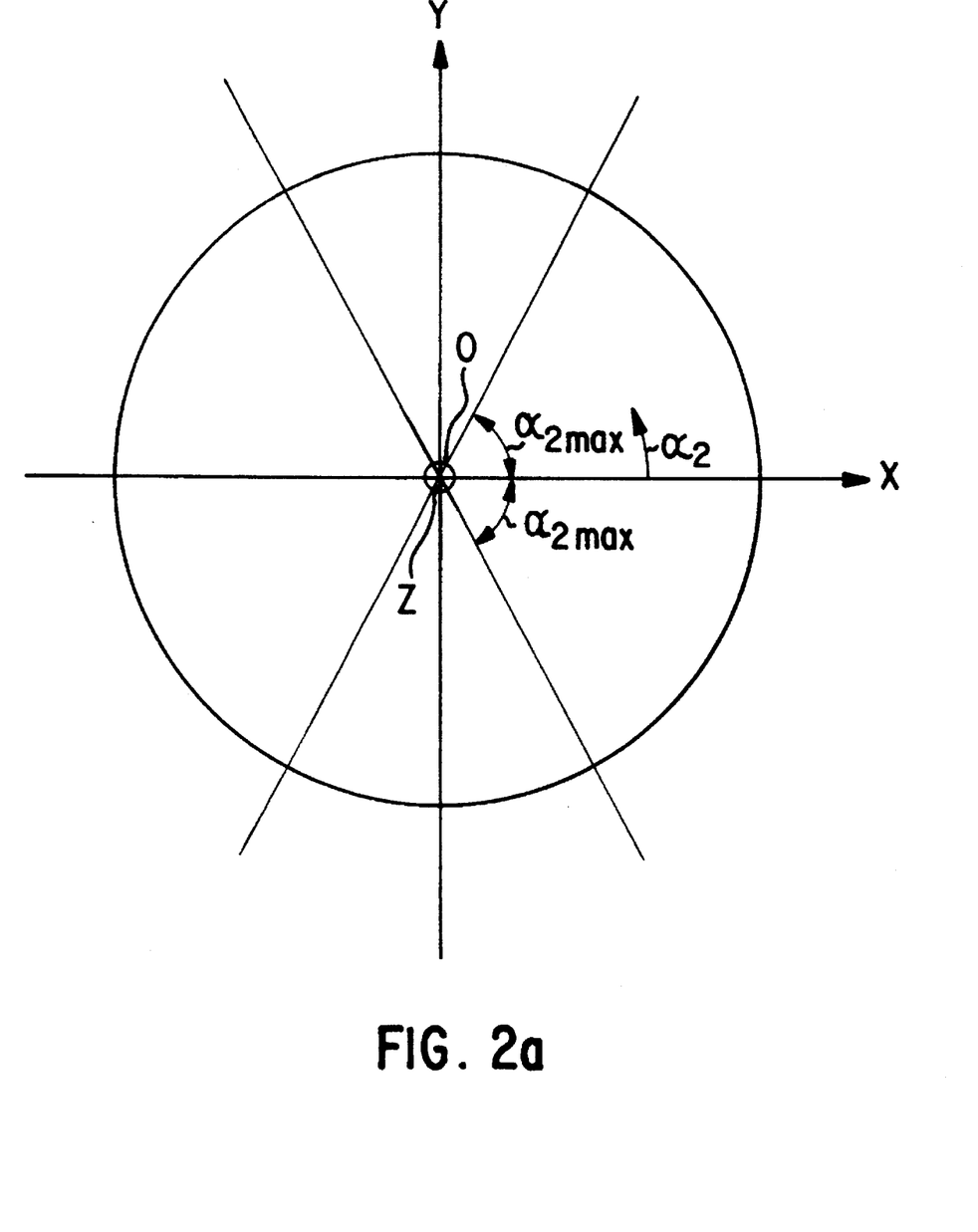
FIG. 2a, b are schematic views of the field of view of the sun sensors.

FIG. 2a illustrates how the field of view or the measuring range of the sun sensors is aligned symmetrically with respect to the XZ-plane as well as rotationally symmetrically with respect to the Y-axis of the satellite-fixed system of coordinates XYZ. This measuring range comprises an angular range of $\alpha_{2max} \geq \alpha_2 \geq -\alpha_{2max}$ relative to the XZ-plane which is to be imagined rotationally symmetrically with respect to the Y-axis and, on the whole, therefore permits an all-around view ($0 \leq \alpha_1 \leq 2\pi$). A solid-angle range of the shape of a double cone with an opening angle $2[(\pi/2)-\alpha_{2max}]$., which is centered in the origin 0 of the systems of coordinates and is situated about the Y-axis in a rotationally symmetrical manner, is therefore not contained within the measuring range of the sun sensors.

Figure 2B:
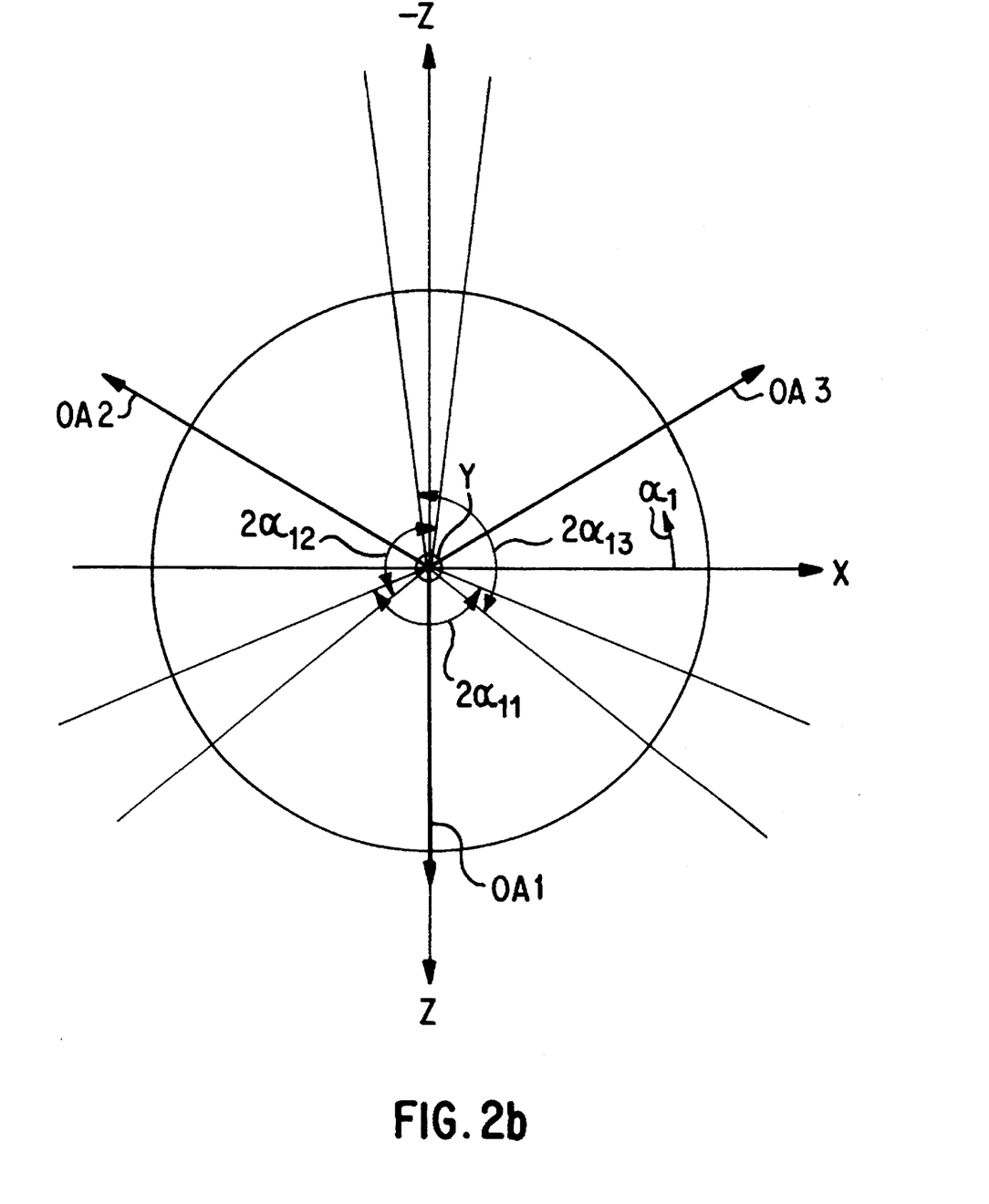

FIG. 2b shows how the all-around view in the XZ-plane can be caused by three sun sensors which are arranged at an angular distance of 120° from one another and have the optical axes OA1 to OA3. In this embodiment, each of the three sun sensors in the XZ-plane has a measuring range of $2\alpha_{11}$, $2\alpha_{12}$ and $2\alpha_{11}$ of in each case, for example, ±67° which is centered about its optical axis. In this concrete case, this results in an overlapping of the adjacent measuring ranges of 14° respectively. In the Y-direction, the measuring range is $\pm \alpha_{2max}$ respectively.

Naturally, other constellations of individual sun sensors are also possible which, however, together must furnish the required all-around view in a plane of the satellite-fixed system of coordinates, for example, in the XZ-plane, with a certain width perpendicularly to it.

For each of the sun sensors which measures in two axes, two sun sensors may also be used which measure in one axis and whose measuring directions are rotated about the respective optical axis by 90°.

Figure 3A:
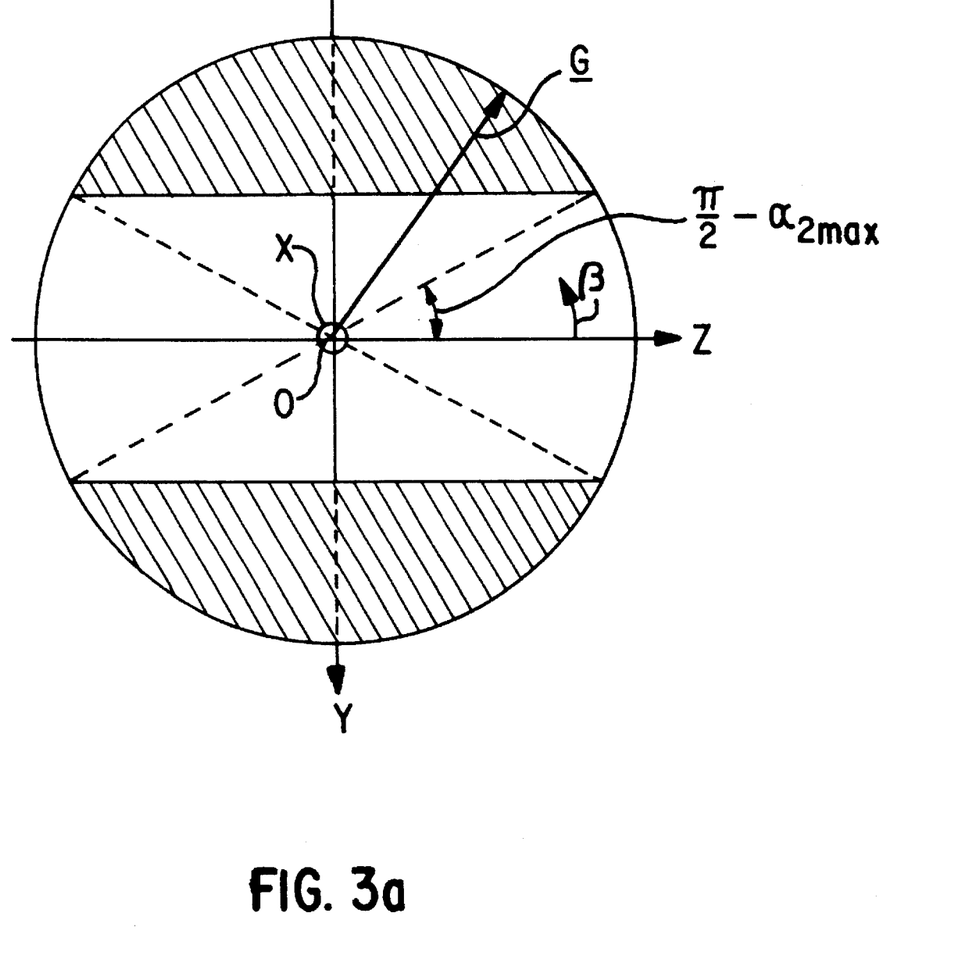
FIG. 3 is a schematic view of the permissible solid-angle range for the measuring axis of the speed gyroscope.

FIG. 3a shows the permissible solid-angle range for the measuring axis of the speed gyroscope. A unit sphere (radius 1) is shown in the lateral view which is centered about the origin 0 of the satellite-fixed system of coordinates XYZ. The unit vector $\underline{G}$ represents the measuring axis of the speed gyroscope. For the end point of the unit vector $\underline{G}$ on the unit sphere, the hatched solid-angle range is permitted. This solid-angle range is rotationally symmetrical with respect to the Y-axis and comprises for the angle $\beta_2$ measured from the XZ-plane, the ranges $|\beta_2| \leq (\pi/2)-\alpha_{2max}$. Naturally, the position of the vector $\underline{G}$ is not limited to the YZ-plane, as illustrated in FIG. 3a, but the whole range of $0 \leq \alpha_1 \leq 2\pi$ is permitted at first.

Figure 3B:
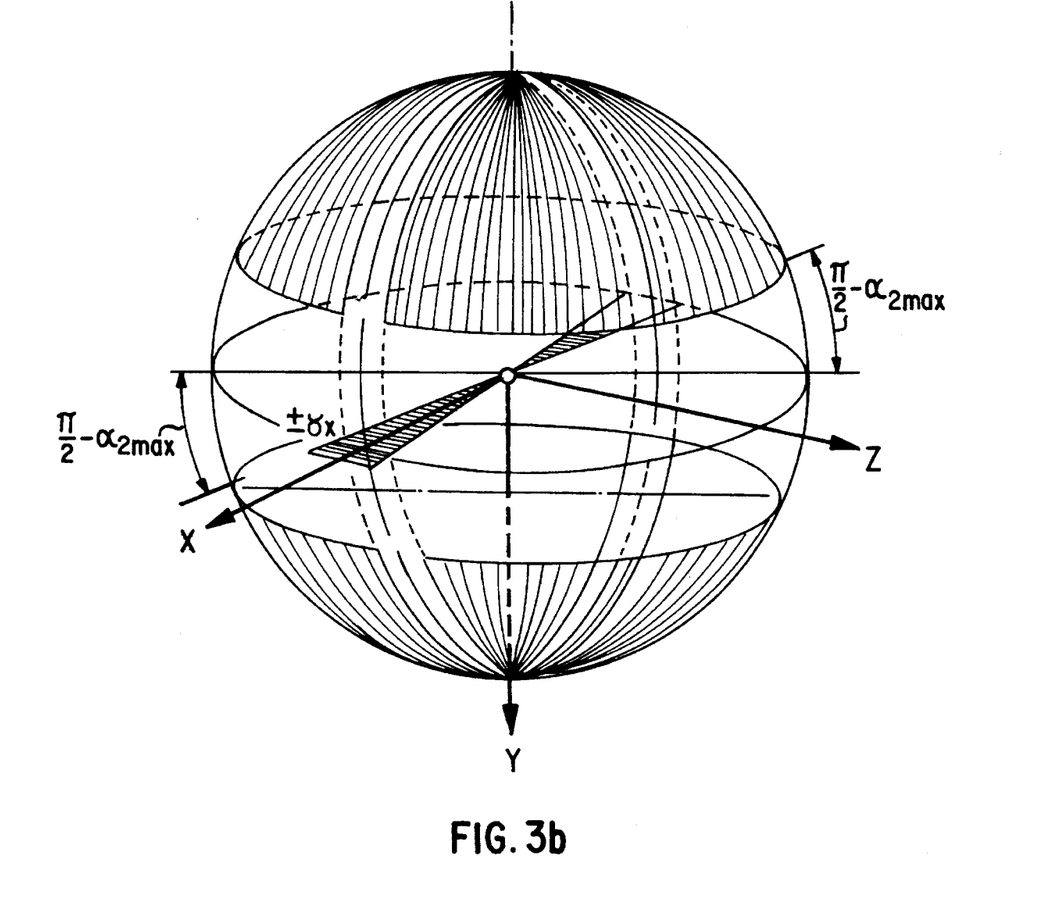

FIG. 3b is a perspective representation of the situation illustrated in FIG. 3a but with a further limitation of the permissible solid-angle range for the measuring axis of the speed gyroscope (vector $\underline{G}$). This not permitted solid-angle range is generated by an angle range $\pm y_x$ situated in the XZ-plane on both sides of the X-axis as well as by the rotation of the angle about the Z-axis. Thus, the four zones which are shown in a hatched manner according to FIG. 3b on the unit ball shown there remain as the permissible solid-angle range for the measuring axis of the speed gyroscope.

The measuring arrangement according to the invention makes it possible to determine the sun vector $\underline{S} = (S_x, S_y, S_z)^T$ by means of the sun sensors and the component $\omega_m$ of the rotational speed vector $\underline{\omega}$ of the satellite which is in parallel with the measuring axis of the speed gyroscope by means of the speed gyroscope as the important measuring quantities for the attitude control. The sun vector $\underline{S}$ which, according to the definition, is a unit vector ($|\underline{S}|=1$), indicates in which direction the sun is situated with respect to the satellite-fixed system of coordinates XYZ. The measuring axis of the speed gyroscope is represented by a unit vector $\underline{G}=(G_x, G_y, G_z)^T$ ($|\underline{G}|=1$). For the component $\omega_m$ of the rotational speed vector $\underline{\omega}$ of the satellite, the following will then apply:

$$\omega_m = \underline{G}^T \cdot \underline{\omega}$$

The upper index T denotes the transposed form of a vector or of a matrix so that the vector $\underline{G}$ is defined as a column vector, and the vector $\underline{G}^T$ which is used in the above-indicated scalar product, in turn, is defined as a line vector. It is known that it is customary to represent, in the case of a scalar product of two vectors, one as a column vector and the other as a line vector.

By means of the two measuring quantities $\underline{S}$ as well as $\omega_m$, it becomes possible to determine the two vectors which are decisive for the attitude control, specifically the rotational speed vector $\underline{\omega}$ of the satellite as well as the vector $\underline{d}$ of the satellite deviation, with respect to a preset reference position.

In this case, the determination of the rotational speed vector $\underline{\omega}$ of the satellite takes place according to the following rules:

$$\underline{w} = \underline{w}_p + \underline{w}_q \tag{1a}$$
$$\underline{w}_q = -\tilde{\underline{S}} \cdot \hat{\underline{S}} \tag{1b}$$
$$\underline{w}_p = \underline{S}(\underline{S}^T \cdot \underline{w}) \tag{1c}$$
$$\underline{S}^T \cdot \underline{w} = \frac{w_m - \underline{G}^T \cdot \underline{w}_q}{\underline{G}^T \cdot \underline{S}} \tag{1d}$$

wherein $\underline{\omega}_q$, $\underline{\omega}_p$ are the components of the rotational speed vector of the satellite perpendicularly or in parallel to the sun vector $\underline{S}$ and $\tilde{\underline{S}}$ is a skew-symmetrical matrix for the alternative representation of the vector product $\underline{S} \times \tilde{\underline{S}}$ with $$\tilde{\underline{S}} = \begin{bmatrix} 0 & -S_z & S_y \\ S_z & 0 & -S_x \\ -S_y & S_x & 0 \end{bmatrix}$$

$\underline{S}^T \cdot \underline{\omega}$, $\underline{G}^T \underline{\omega}_q$, $\underline{G}^T \cdot \underline{S}$ are scalar products of the corresponding vectors and $\hat{\underline{S}}$ is the time derivation of the sun vector which can be obtained from the measuring signals of the sun sensor arrangement ($\underline{S}$) by numerical differentiation or by way of a high pass, preferably of the second order, approximately according to the transfer function:

$$\hat{\underline{S}} = \frac{(T_1 + T_2)s^2 + s}{(1 + T_1 s)(1 + T_2 s)} \cdot \underline{S} \tag{1e}$$

In practice, it was found to be expedient, when carrying out the computing operations according to equations (1a) to 1(d), to check the numerical value of the scalar product $\underline{G}^T \cdot \underline{S}$ with respect to its amount and, if its value falls below a preset lower limit (such as 0.1), because of the numerical difficulties that will then have to be expected, the computation of equations (1d) and (1c) must be avoided, and in equation (1a), the vector $\underline{\omega}_p$ must simply be equalled to 0.

The rotational speed vector $\underline{\omega}$ of the satellite may be obtained from the measured sun vector $\underline{S}$, its time derivative $\hat{\underline{S}}$ and the gyroscope signal $\omega_m$ also while forming the matrix $\underline{M}$ according to the following rule:

$$\underline{w} = (\underline{M}_T \cdot \underline{M})^{-1} \cdot \underline{M}^T \begin{bmatrix} \hat{\underline{S}} \\ w_m \end{bmatrix}, \underline{M} = \begin{bmatrix} 0 & -S_z & S_y \\ S_z & 0 & -S_x \\ -S_y & S_x & 0 \\ G_x & G_y & G_z \end{bmatrix} \tag{1f}$$

which is obtained from the following formulation:

$$\begin{bmatrix} \tilde{\underline{S}} \\ \underline{G}^T \end{bmatrix} \cdot \underline{w} \equiv \underline{M} \cdot \underline{w} = \begin{bmatrix} \hat{\underline{S}} \\ w_m \end{bmatrix} \tag{1g}$$

In the case of this type of determination of $\underline{\omega}$, according to the linear theory, an estimated value of a minimal quadratic error is obtained for the rotational speed vector. However, in practice, in the case of a poorly conditioned matrix $\underline{M}$, numerical problems may occur; for example, when the sun vector $\underline{S}$ is situated perpendicularly on the measuring axis $\underline{G}$ of the speed gyroscope. Since the first-mentioned variant for determining the rotational speed vector $\underline{\omega}$, as mentioned above, offers a simple possibility for avoiding such numerical problems, this variant should be preferred.

The satellite deviation vector $\underline{d} = (d_x, d_y, d_z)^T$ relates the measured sun vector $\underline{S}$ to a reference sun vector $\underline{S}_R$ which indicates the desired direction for the sun vector $\underline{S}$. A deviation exists when the sun vector $\underline{S}$ does not coincide with the reference sun vector $\underline{S}_R$. Such a deviation is caused by the rotation of the satellite out of its reference direction, in which case this rotation can be represented as the sum of rotations about the angles $\phi$, $\Theta$ and $\psi$ about the coordinate axes X, Y and Z ($\phi$, $\Theta$, $\psi$ are Eulerian angles). The satellite deviation vector $\underline{d}$ which describes this composite rotation, in the case of small deviations, can be represented with respect to its components directly by the Eulerian angles: $\underline{d} = (\phi, \Theta, \psi)^T$. Vector $\underline{d}$ can be determined from the measuring quantities $\underline{S}$ and $\underline{\omega}_m$ according to the following rules:

$$\underline{d} = \underline{d}_q + \underline{d}_p \tag{2a}$$
$$\underline{d}_q = -\tilde{\underline{S}}_R \cdot (\underline{S} - \underline{S}_R) \equiv -\tilde{\underline{S}}_R \cdot \underline{S} \tag{2b}$$
$$\underline{d}_p = \underline{S}_R(\underline{S}_R^T \cdot \underline{d}) \tag{2c}$$
$$\underline{S}_R^T \cdot \underline{d} = \frac{\xi - \underline{G}^T \cdot \underline{d}_q}{\underline{G}^T \cdot \underline{S}_R} \tag{2d}$$

$$\xi \equiv \underline{G}^T \cdot \underline{d} = \int_o^t w_m dt \tag{2e}$$

wherein $\underline{d}_q$, $\underline{d}_p$ are of the satellite deviation vector $\underline{d}$ perpendicularly and in parallel to the reference sun vector $\underline{S}_R$ (|$\underline{R}$|=1), $\tilde{\underline{S}}_R$ is the skew-symmetrical vector product matrix formed analogously to $\tilde{\underline{S}}$ from the vector components of $\underline{S}_R$, and $\epsilon$ is the integrated measuring signal of the speed gyroscope.

Also in this case, numerical difficulties in the implementation of the rules according to equations (2a) to (2e) can be avoided in a simple manner by controlling the amount of the scalar product $\underline{G}^T \cdot \underline{S}_R$, as described in connection with the determination of the rotational speed vector $\underline{\omega}$. In addition, the satellite deviation vector $\underline{d}$ can be determined analogously to the rotational speed vector $\underline{\omega}$ by means of a matrix $\underline{M}_R$, specifically according to the rule $$\underline{d} = (\underline{M}_R^T \cdot \underline{M}_R) \cdot \underline{M}_R^T \begin{bmatrix} \underline{S} - \underline{S}_R \\ \xi \end{bmatrix} \tag{2f}$$

This is based on the application of the linear theory for small deviations, in which case the following applies in an approximate manner ($\underline{E}$ is the unit matrix):

$$(\underline{E} - \tilde{\underline{d}}) \cdot \underline{S}_R = \underline{S} \tag{2g}$$
$$\tilde{\underline{S}}_R \cdot \underline{d} = \underline{S} - \underline{S}_R(= -\tilde{\underline{d}} \cdot \underline{S}_R!)$$
$$\underline{G}^T \cdot \underline{d} = \xi$$

$$\begin{bmatrix} \tilde{\underline{S}}_R \\ \underline{G}^T \end{bmatrix} \cdot \underline{d} \equiv \underline{M}_R \cdot \underline{d} = \begin{bmatrix} \underline{S} - \underline{S}_R \\ \xi \end{bmatrix}$$

Figure 4:
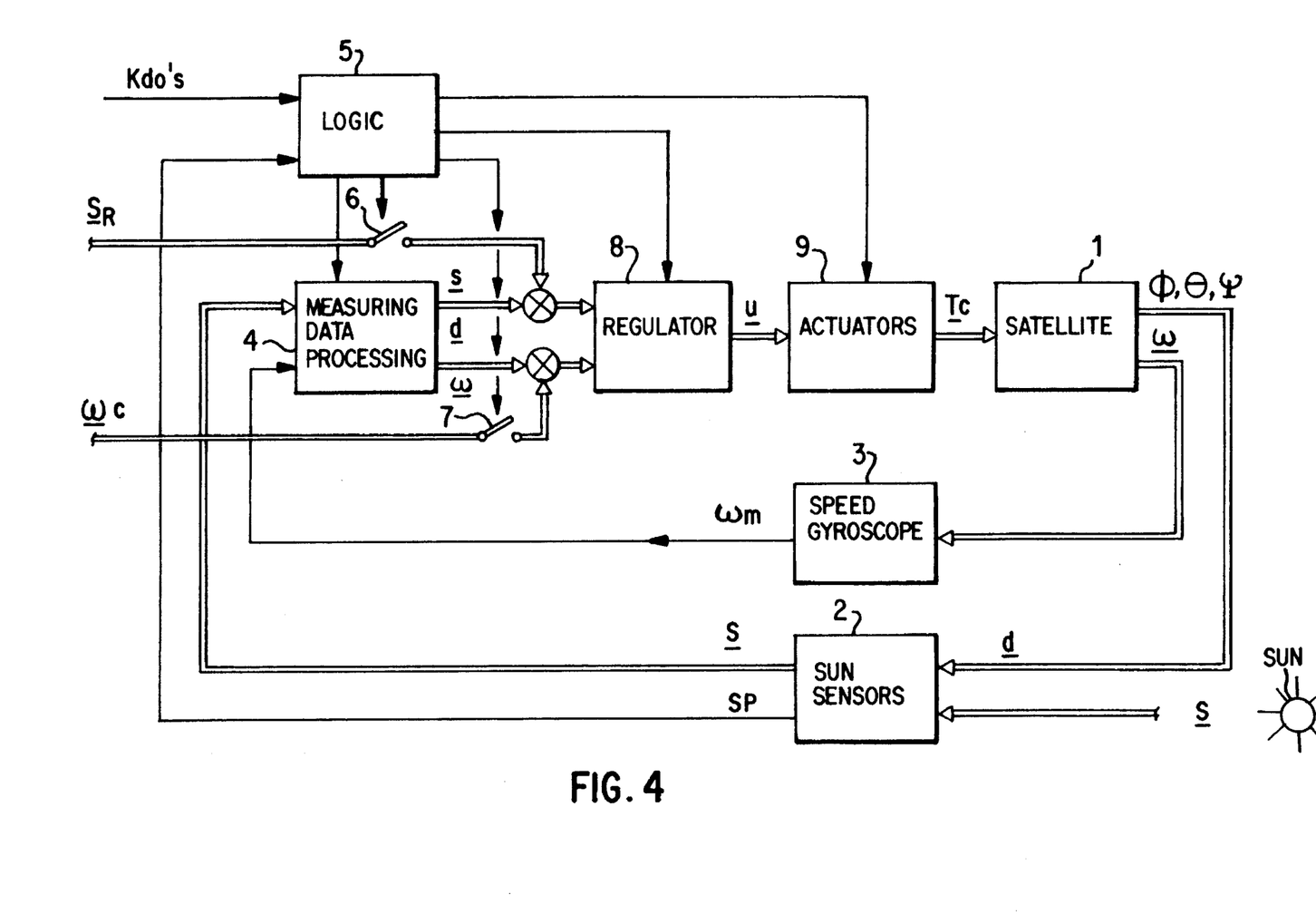
FIG. 4 is a block diagram of a regulation system using the measuring arrangement according to the invention.

As an example of an application possibility of the measuring arrangement according to the invention, FIG. 4 shows a block diagram of an attitude control system for the implementation of transfer orbit and acquisition maneuvers in the case of a three-axis stabilized earth satellite. The satellite 1 is characterized by its rotational speed vector $\underline{\omega}$ as well as by its deviation (Eulerian angle $\phi$, $\Theta$, $\psi$) with respect to the reference sun vector $\underline{S}_R$ (deviation vector $\underline{d}$) which represents the preset desired orientation. The real sun vector $\underline{S}$ which is caused by the deviation and differs from the reference sun vector is measured by means of the sun sensors 2 as soon as the sun is situated in their measuring range which is indicated by a corresponding signal (sun presence—SP). An integrating speed gyroscope 3, which measures in one axis, measures the component $\omega_m$ of the rotational speed vector $\underline{\omega}$ of the satellite which is in parallel to its measuring axis. The evaluation of the measured quantities $\omega_m$ and $\underline{S}$ takes place in a measuring data processing system 4 according to the rules (1a) to (1d) and (2a) to (2e) so that the vector quantities $\underline{S}$, $\underline{d}$ as well as $\underline{\omega}$ are available at the output. By means of external commands and internal logic signals (such as SP), a logic 5 provides that, in the regulator 8, which follows, the pertaining control laws are used, that the correspondingly required vector quantities are determined in the measured data processing unit 4, and, by way of switches 6, 7, the required reference quantities, that is, the reference sun vector $\underline{S}$ a as well as the commanded rotational speed vector $\underline{\omega}_C$, are locked on. At the output of the regulator 8, a vectorial control quantity $\underline{u}$ will then be present which causes the actuators 9 to supply corresponding torques $I_c$ for the satellite 1.

Signal paths for vector quantities are illustrated by double arrows in FIG. 4; those for scalar quantities or logic signals are shown by means simple action lines. The implementation of the logic sequences as well as of the rules for data processing and the control laws may take place by using logical units and electric networks or in an onboard computer.

The earth sensors which are required for the earth acquisition and orientation are not illustrated in FIG. 4.

The control laws for the implementation of the transfer orbit maneuver can be indicated as follows in a general form in vector notation:

$$\underline{u} = -\underline{K}_D L_D(\underline{\omega} - \underline{\omega}_C) + \underline{K}_p L_p(+\text{e.otl } \underline{S} + \text{ee }_R \underline{S}) \quad (3a)$$

wherein $\underline{K}_p = \text{diag}(k_{PX}, k_{PY}, k_{PZ})$ as well as $\underline{K}_D = \text{diag}(k_{DX}, k_{DY}, k_Z)$ are the diagonal matrices of the attitude and speed amplification factors; $L_p$ and $L_D$ are signal boundaries; and $\underline{\omega}_C$ is the commanded rotational speed vector (for example, for searching movements and in the case of a sun orientation). The attitude and speed amplification factors take into account the nature and arrangement of the actuators, such as the attitude control nozzles, possibly their different lever arms or different moments of inertia with respect to rotations about the different satellite axes, with the object of generating uniform torque components about the above-mentioned axes. The signal boundaries have the character of operators and provide that the two vectorial fractions of the control quantity vector $\underline{u}$ indicated in equation (3a) cannot exceed preset limits with respect to their amount so that no excessive pendulum motions are excited about the desired orientation to be endeavored.

For the pure rotational speed control about individual vehicle axes, for example, about the Z-axis in the case of a sun orientation (Position $P_1$ in FIG. 1), the corresponding component of the amplification matrix for the attitude lock-on ($K_{PX}$, $K_{PY}$, $K_{PZ}$) may be equalled to 0.

One of the most important maneuvers, which must be implementable at any time, will be required when the sun is not situated in the measuring range of one of the sun sensors and, as a result, a complete determination of the rotational speed vector is not possible. This may occur in any starting position of the satellite or in the case of an excessive drift from the desired orientation. In that case, while the control law $$\underline{u} = -\underline{K}_D \underline{G} \underline{G}^T \underline{\omega} \quad (3b)$$

is used, the component $\omega_m = \underline{g}^T \underline{\omega}$ of the rotational speed $\underline{\omega}$ of the satellite, which can be measured via the single-axis speed gyroscope, is first controlled to 0. The satellite can then still rotate unnoticeably only about an axis which is perpendicular to the measuring axis of the speed gyroscope.

Here, the important characteristic of the invention will now apply which determines the permissible orientation of the measuring axis of the speed gyroscope with respect to the measuring range of the sun sensors ($|\alpha_2| \leq \alpha_{2max}$). Specifically, when the measuring axis is situated in the range $|\beta_2| \leq (\pi/2) - \alpha_{2max}$, this ensures that the direction which is perpendicular to the measuring axis is situated within the measuring range of the sun sensors. When the satellite then rotates about this direction which is perpendicular with respect to the measuring axis, the sun, depending on the rotational speed, will sooner or later move into the measuring range of the sun sensors because, during the rotation, this measuring range sweeps over the whole celestial sphere. When, in contrast, the measuring axis of the speed gyroscope is situated outside the above-defined permissible range, space ranges will always exist, which are arranged rotationally symmetrically in a double-cone shape about the direction which is oriented perpendicularly to the measuring axis, which cannot be detected by the measuring range of the sun sensors.

If the rotation about the axis which is perpendicular to the measuring axis which is obtained after the control law according to equation (3b) is applied and which, however, is not known, is too slow or even equal to 0, and the sun will therefore, after the expiration of a preset time period, not appear in the measuring range of one of the sun sensors, the satellite, as indicated schematically in FIG. 4 by means of a logic signal, is subjected by the direct triggering of the actuators 9 by means of a torque pulse of a preset amount, to a rotational motion, for example, about an axis of rotation situated in the XZ-plane, which leads the sun into the field of view or the measuring range of the sun sensors.

The above-mentioned further limitation of the permissible range for the orientation of the measuring axis of the speed gyroscope illustrated in FIG. 3b has the following reasons: FIG. 3b is based on the assumption that an operating phase is planned or can be predicted during which the sun vector $\underline{S}$ is to coincide with the positive Z-axis. When the measuring axis of the speed gyroscope is then situated in the XY-plane, it is not possible to measure rotational speed components perpendicularly to the XY-plane. The reason is that, in this case, the speed gyroscope measures only rotational speed components in the XY-plane, and a rotational speed component which exists. perpendicularly to this plane can also not be measured by means of the sun sensors because this component is situated precisely in the direction of the sun vector $\underline{S}$ or the Z-axis. The sun vector will therefore precisely maintain its orientation within the system of coordinates despite the rotation of the satellite. For this reason, the prohibited range $\pm y_x$ shown in FIG. 3b is provided for the measuring axis of the speed gyroscope. When the measuring axis is situated outside this prohibited range, the speed gyroscope can also detect a rotational speed component in the Z-direction if $Y_x$ is not selected to be too small. The general condition for the capability of the speed gyroscope to measure rotational speed components in the direction of the sun vector $\underline{S}$ can be formulated in that the scalar product from the vector $\underline{G}^T$ representing the measuring axis and the sun vector $\underline{S}$ must not disappear or must have a certain minimum value:

$$\underline{G}^T \cdot \underline{S} \geq \epsilon > 0$$

From the presettable value for $\epsilon$, the following is obtained in the present concrete case for the prohibited angle range of $\pm y_X: \epsilon = \sin(y_X)$ an operating condition is provided in which the sun vector $\underline{S}$ is to be oriented in the direction of the X-axis, an angle range $\pm y_Z$ must be prohibited on both sides of the Z-axis and rotationally symmetrically with respect to the X-axis for the measuring axis of the speed gyroscope. The above-mentioned condition is to be applied correspondingly to differently situated reference orientations of the sun vector $\underline{S}$.

Although the invention has been described and illustrated in detail, is to be clearly understood that the same is by way of illustration and example, and is not top be taken by way of limitation. The spirit and scope of the present invention are to be limited only by the terms of the appended claims.

We claim:

1. A measurement arrangement for use in controlling attitude of a three-axis stabilized satellite, said arrangement comprising:

sun sensor that determine a sun vector indicating a direction of the sun with respect to a satellite-fixed system of coordinates XYZ, said sun sensors having a measuring range which comprises full all-around view in a preselected plane and a limited angle range of $|\alpha_2| \leq \alpha_{2max}$, with $\alpha_{2max} < \pi/2$, perpendicularly to said preselected plane on both sides thereof; and an integrating speed gyroscope which measures in a single measuring axis $\underline{G} = (G_X, G_Y, G_Z)^T$, said measuring axis enclosing an angle $\beta$ relative to the preselectable plane, wherein $|\beta| \geq (\pi/2) - \alpha_{2max}$.

2. A measurement arrangement according to claim 1, wherein the integrating speed gyroscope is oriented by its measuring axis ($\underline{G}$) such that the conditions:

$$G^T \cdot \underline{S}_{Ri} \geq \epsilon > 0$$

are always met, wherein $\underline{S}_{Ri}$ are reference sun vectors for different predictable operation phase characterized by index i in which a respective corresponding desired orientation must be maintained for an extended period of time.

3. A evaluation process for determining rotational speed of a satellite, comprising the steps of:

measuring a sun vector $\underline{S}$ with sun sensors;

determining a time deviating +e,dot S+ee with sun vector $\underline{S}$;

obtaining a measuring signal $\omega_m$ from a speed gyroscope;

determining a rotational speed vector +e,dus $\omega$ of the satellite according to the rule $$\underline{\omega} = \underline{\omega}_q + \underline{S} \cdot \frac{\omega_m - \underline{G}^T \cdot \underline{\omega}_q}{\underline{G}^T \cdot \underline{S}}$$

$$\underline{\omega}_q = -\tilde{\underline{S}} \cdot \dot{\underline{S}}$$

with the matrix $$\tilde{\underline{S}} = \begin{bmatrix} 0 & -S_Z & S_Y \\ S_Z & 0 & -S_X \\ -S_Y & S_X & 0 \end{bmatrix}.$$

4. An evaluation process for determining deviation of a satellite with respect to a reference direction which can be preset for a sun vector $\underline{S}$, comprising:

measuring the sun vector $\underline{S}$ by sun sensors;

determining a satellite deviation vector $\underline{d}$ from the sun vector $\underline{S}$ measured by the sun sensors, reference sun vector $\underline{S}_R$ representing a reference direction, and a measuring signal $\underline{\omega}_m$ of a speed gyroscope, according to the rule $$\underline{d} = \underline{d}_q + \underline{S}_R \frac{\xi - \underline{G}^T \cdot \underline{d}_q}{\underline{G}^T \cdot \underline{S}_R}$$

$$\underline{d}_q = -\tilde{\underline{S}}_R \cdot \underline{S}$$

with $$\xi = \int_o^t \omega_m dt$$

and the matrix $$\tilde{\underline{S}}_R = \begin{bmatrix} 0 & -S_{RZ} & S_{RY} \\ S_{RZ} & 0 & -S_{RX} \\ -S_{RY} & S_{RX} & 0 \end{bmatrix}.$$

5. An evaluation process for determining a satellite deviation with respect to a reference direction which can be preset for a sun vector $\underline{S}$, comprising:

measuring the sun vector $\underline{S}$ with sun sensors;

determining a satellite deviation vector $\underline{d}$ of the from the sun vector $\underline{S}$ measured by the sun sensors, a reference sun vector $\underline{S}_R$ representing a reference direction, and a measuring signal $\omega_m$ of a speed gyroscope, according to the rule $$\underline{d} = \underline{d}_q + \underline{S}_R \frac{\xi - \underline{G}^T \cdot \underline{d}_q}{\underline{G}^T \cdot \underline{S}_R}$$

with $$\xi = \int_o^t \omega_m dt$$

and the matrix $$\tilde{\underline{S}}_R = \begin{bmatrix} 0 & -S_{RZ} & S_{RY} \\ S_{RZ} & 0 & -S_{RX} \\ -S_{RY} & S_{RX} & 0 \end{bmatrix}.$$

6. An evaluation process for determining the satellite deviation with respect to a reference direction which can be preset for a sun vector $\underline{S}$ for the case of small deviations, comprising:

measuring a sun vector $\underline{S}$ with sun sensors; and determining a satellite deviation vector $\underline{d}$ from the sun vector $\underline{S}$ measured by the sun sensors, a reference sun vector $\underline{S}_R$ representing a reference direction, and a measuring signal $\omega_m$ of a speed gyroscope of the satellite, according to the rule $$\underline{d} = (\underline{M}_R^T \cdot \underline{M}_R) \cdot M_R^T \begin{bmatrix} \underline{S} - \underline{S}_R \\ \xi \end{bmatrix}$$

with the matrix $$M_R = \begin{bmatrix} \tilde{\underline{S}}_R \\ \underline{G}^T \end{bmatrix}.$$

7. A regulating system for a three-axis stabilized satellite for implementing attitude control maneuvers using a measuring arrangement, said regulating system comprising:

sun sensors which produce measuring signals;

a speed gyroscope which produces a measuring signal;

actuators which generate controlling torques about satellite-fixed coordinate axes (XYZ);

a regulator connected to the actuators;

means for processing said measuring signals of the sun sensors and of the speed gyroscope to determine for said satellite a rotational speed vector +e,dus $\omega$, a deviation vector $\underline{d}$, and a sun vector $\underline{S}$ from the measuring signals, and furnishing corresponding input signals to the regulator;

a switching device for connecting at least one of a reference sun vector $\underline{SR}_R$ and a commanded rotational speed vector of the satellite to an input of the regulator.

8. A regulating system according to claim 7, wherein the regulator forms an output signal for control of the actuators according to the following:

$$\underline{u} = -\underline{K}_D L_D (\underline{\omega} - \underline{\omega}_C) + \underline{K}_P L_P (\underline{\tilde{S}}_R \cdot \underline{S})$$

wherein $\underline{K}_P$ and $\underline{K}_D$ form diagonal matrices of the attitude and speed amplification factors, and $L_P$ and $L_D$ are signal boundaries.

9. A regulating system according to claim 7, further comprising:

means for acquiring the sun from any starting position of the satellite in which the sun is not situated within the field of view of the sun sensors, wherein the regulator first emits an output signal of the form $$\underline{u} = -\underline{K}_D G G^T \cdot \underline{\omega}$$

to the actuators to control to zero the component $g^T \cdot \underline{\omega}$ of the rotational speed vector $\underline{\omega}$ of the satellite, which can be measured via the speed gyroscope; and means for feeding a control signal to the actuators, if after the expiration of a presettable time period, the sun does not appear in the field of view of the sun sensors, by which control signals the actuators are caused to emit a torque pulse of a presettable magnitude to cause the satellite to carry out a rotation about an axis which is situated in the measuring plane and extends through the origin 0 of the system of coordinates, which rotation leads the sun into the field of view of the sun sensors.

* * * * *